US012608277B2

(12) United States Patent
Galbraith et al.

(10) Patent No.: US 12,608,277 B2
(45) Date of Patent: Apr. 21, 2026

(54) REBUILDING FAILED DRIVES WITH REDUCED WRITE OVERHEAD

(71) Applicant: International Business Machines Corporation, Armonk, NY (US)

(72) Inventors: Robert Edward Galbraith, Rochester, MN (US); Joseph Roger Edwards, Rochester, MN (US); Adrian C. Gerhard, Rochester, MN (US); Clint A Hardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 18/785,938

(22) Filed: Jul. 26, 2024

(65) Prior Publication Data

US 2026/0030109 A1    Jan. 29, 2026

(51) Int. Cl.
*G06F 11/00* (2006.01)
*G06F 11/10* (2006.01)

(52) U.S. Cl.
CPC ................................ *G06F 11/1092* (2013.01)

(58) Field of Classification Search
CPC .............. G06F 11/108; G06F 11/1088; G06F 11/1092; G06F 11/1096; G06F 11/1662; G06F 11/2094
See application file for complete search history.

(56) References Cited

U.S. PATENT DOCUMENTS 8,751,862 B2 * 6/2014 Cherian .............. G06F 11/1092
714/6.24
9,430,333 B2 * 8/2016 D'Amato ............ G06F 11/1458
(Continued)

FOREIGN PATENT DOCUMENTS

CN        109032513 B      8/2020
CN        114063929 B     10/2023

OTHER PUBLICATIONS

Lin et al., "Fast Online Reconstruction for SSD-Based RAID-5 Storage Systems," IEEE Transactions on Computer-Aided Design of Integrated Circuits and Systems, vol. 43, Jun. 2024, pp. 1886-1899.

(Continued)

*Primary Examiner* — Marc Duncan
(74) *Attorney, Agent, or Firm* — Zilka-Kotab, P.C.

(57) ABSTRACT

A computer-implemented method according to one approach, is for rebuilding a drive in a redundant array of independent disks (RAID) array. The method includes causing blocks in a replacement drive to be pre-formatted in response to: a failed drive in the RAID array being replaced with the replacement drive, and a determination that the replacement drive can be pre-formatted. The method also includes recreating blocks of data that were stored in the failed drive, and determining whether the recreated blocks are equivalent to deallocated blocks. In response to determining one or more of the recreated blocks are not equivalent to deallocated blocks, data in the one or more recreated blocks is written to corresponding blocks in the replacement drive. However, in response to determining one or more of the recreated blocks are equivalent to deallocated blocks, the method includes intentionally refraining from modifying corresponding blocks in the replacement drive.

25 Claims, 10 Drawing Sheets

(56) References Cited

U.S. PATENT DOCUMENTS

| | | | | |
|---|---|---|---|---|
| 9,804,939 | B1 * | 10/2017 | Bono | ................... G06F 11/2094 |
| 9,910,748 | B2 | 3/2018 | Pan | |
| 10,289,500 | B2 | 5/2019 | Hands | |
| 10,628,054 | B2 | 4/2020 | Galbraith et al. | |
| 10,922,177 | B2 | 2/2021 | Gong et al. | |
| 2006/0041793 | A1 * | 2/2006 | Cherian | .............. G06F 11/1092 |
| | | | | 714/E11.034 |
| 2009/0249118 | A1 * | 10/2009 | Sakurai | ............... G06F 11/1466 |
| | | | | 714/E11.091 |
| 2010/0079885 | A1 * | 4/2010 | McKean | ............. G06F 11/2094 |
| 2016/0246518 | A1 * | 8/2016 | Galbraith | ................. G06F 3/064 |
| 2016/0246678 | A1 | 8/2016 | Galbraith et al. | |
| 2018/0300212 | A1 * | 10/2018 | Gong | .................. G06F 11/1092 |
| 2019/0317889 | A1 | 10/2019 | Chang et al. | |
| 2024/0020030 | A1 | 1/2024 | Sundaresan et al. | |

OTHER PUBLICATIONS

Sha et al., "Proactive Stripe Reconstruction to Improve Cache Use Efficiency of SSD-Based RAID Systems," ACM Transactions on Embedded Computing Systems, vol. 22, Sep. 2023, pp. 1-18.
International Searching Authority, "Notification of Transmittal of the International Search Report and the Written Opinion of the International Searching Authority, or Declaration," Patent Cooperation Treaty, Sep. 26, 2025, 14 pages, International Application No. PCT/EP2025/068606.

* cited by examiner

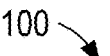

100

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED DATA RECOVERY CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Receive a data request referencing data in the recreated blocks — 352

Is the referenced data below the high water mark? — 354

NO

YES

Use the corresponding blocks in the replacement drive to satisfy the data request — 356

Process data request using the remaining operational drives — 358

REBUILDING FAILED DRIVES WITH REDUCED WRITE OVERHEAD

BACKGROUND

The present invention relates to data storage systems, and more specifically, this invention relates to recovering from drive failures.

Data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models have more intense training phases using larger amounts of training data. Storing data in an efficient and effective manner has therefore been difficult to achieve.

While storing data in redundant array of independent disks (RAID) configurations has been implemented in an effort to improve data availability, the drives in RAID arrays still experience failures over time. For example, drives are at an increased risk of failing while being powered down and powered back up. The drive itself may go through an enhanced power on self-test that finds issues that would not normally be detected at runtime. Moreover, the likelihood of experiencing failure increases as the drives age. It follows that a power loss event across a full storage subsystem may cause one or more drives to fail when power is restored.

Depending on the RAID level, a RAID array may be able to survive one or more drive failures by rebuilding data from missing drive(s) using parity. While the data may ultimately be recovered, it is significantly inefficient to access while recovering from drive failures. Thus, while data requests directed to the failed drives are received, the replacement drive becomes a bottleneck while recovering from a drive failure in a RAID array. Accordingly, a need exists for an improved process of replacing failed drives in data storage systems that store data across various drives.

SUMMARY

A computer-implemented method (CIM) according to one approach, is for rebuilding a drive in a RAID array. The method includes causing blocks in a replacement drive to be pre-formatted in response to: a failed drive in the RAID array being replaced with the replacement drive, and a determination that the replacement drive can be pre-formatted. The CIM also includes recreating blocks of data that were stored in the failed drive, and determining whether the recreated blocks are equivalent to deallocated blocks. In response to determining one or more of the recreated blocks are not equivalent to deallocated blocks, data in the one or more recreated blocks is written to corresponding blocks in the replacement drive. However, in response to determining one or more of the recreated blocks are equivalent to deallocated blocks, the CIM includes intentionally refraining from modifying corresponding blocks in the replacement drive.

A computer program product (CPP) according to another approach is for rebuilding a drive in a RAID array. The CPP includes: a set of one or more computer-readable storage media. The CPP also includes program instructions that are collectively stored in the set of one or more storage media, and are for causing a processor set to perform any combination(s) of the foregoing methodologies.

A computer system (CS) according to still another approach is for rebuilding a drive in a RAID array. The CS includes a processor set and a set of one or more computer-readable storage media. The CS also includes program instructions that are collectively stored in the set of one or more storage media, and which are for causing the processor set to perform any combination(s) of the foregoing methodologies.

A CIM according to another approach, is for rebuilding a drive in a RAID array. The CIM includes: initializing a high water mark in response to: a failed drive in the RAID array being replaced with a replacement drive, and a determination that the replacement drive cannot be pre-formatted. The CIM also includes recreating blocks of data that were stored in the failed drive. In response to determining one or more of the recreated blocks are not equivalent to deallocated blocks, data in the one or more recreated blocks is written to corresponding blocks in the replacement drive. However, in response to determining one or more of the recreated blocks are equivalent to deallocated blocks, the corresponding blocks in the replacement drive are deallocated. Furthermore, the high water mark is advanced to incorporate the corresponding blocks in the replacement drive.

A CPP according to still another approach is for rebuilding a drive in a RAID array. The CPP includes: a set of one or more computer-readable storage media. The CPP also includes program instructions that are collectively stored in the set of one or more storage media, and which are for causing a processor set to perform any combination(s) of the foregoing methodologies.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2A:
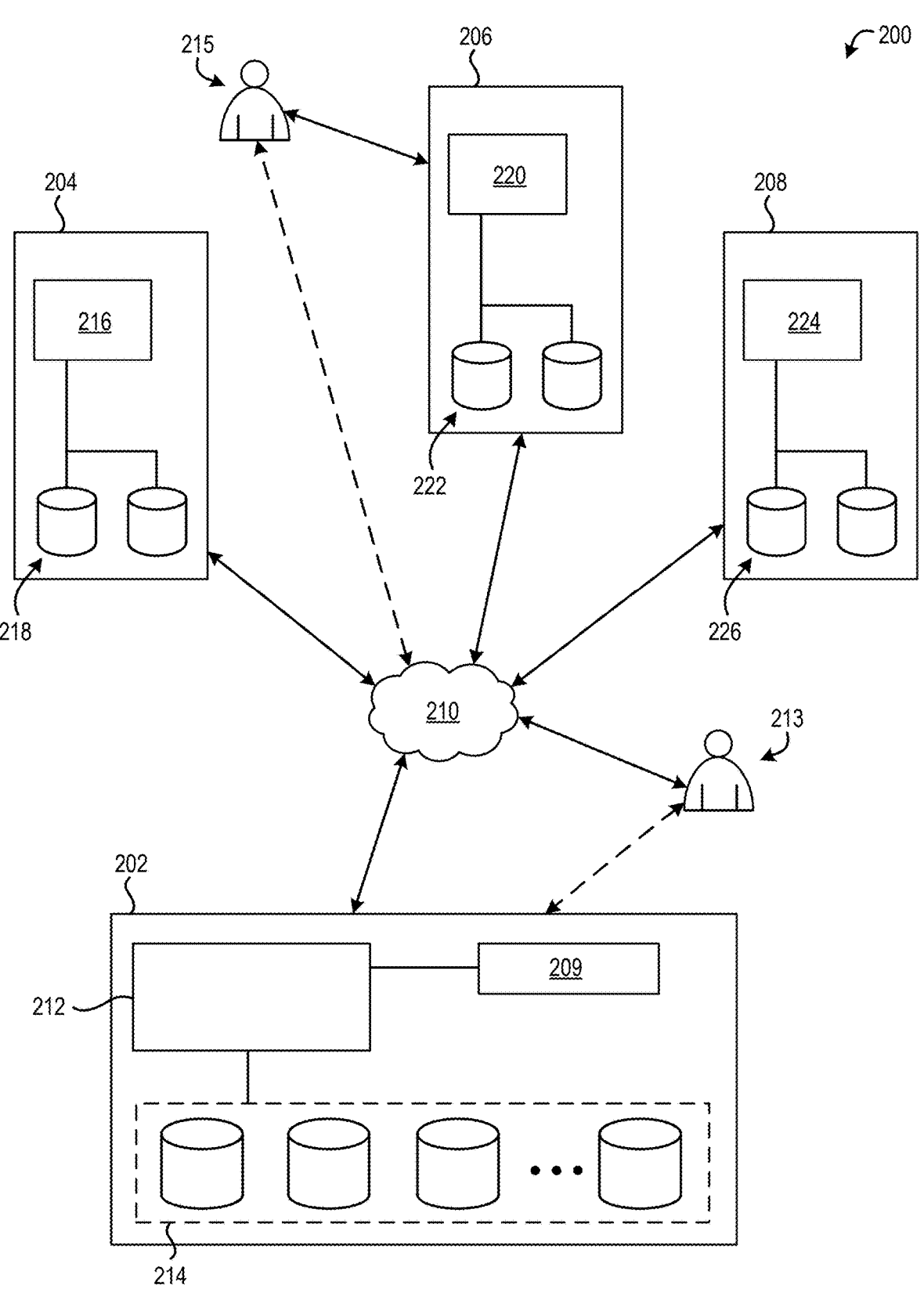
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for recovering from drive failures with increased efficiency. For example, memory drives that have been combined into one or more RAID arrays may be replaced and repaired using one or more of the approaches described herein. Approaches are thereby desirably able to reduce write overhead, and data latency associated with recovering from drive failures. However, it should be noted that the approaches herein may be applied to any configuration of memory components used to store data e.g., such as redundant data drives storing backup (e.g., emergency) copies of data that are updated at times. For instance, by pre-formatting drives and reviewing the data being written thereto, approaches herein are able to significantly reduce write overhead associated with replacing a drive that has failed. Accordingly, data requests are satisfied with far less latency than conventionally achievable, while also ensuring high data availability, e.g., as will be described in further detail below.

In one general approach, In one general approach, a CIM is for rebuilding a drive in a RAID array. The method includes causing blocks in a replacement drive to be pre-formatted in response to: a failed drive in the RAID array being replaced with the replacement drive, and a determination that the replacement drive can be pre-formatted. The CIM also includes recreating blocks of data that were stored in the failed drive, and determining whether the recreated blocks are equivalent to deallocated blocks. In response to determining one or more of the recreated blocks are not equivalent to deallocated blocks, data in the one or more recreated blocks is written to corresponding blocks in the replacement drive. However, in response to determining one or more of the recreated blocks are equivalent to deallocated blocks, the CIM includes intentionally refraining from modifying corresponding blocks in the replacement drive.

It follows that approaches herein are desirably able to recover from drive failures with increased efficiency. For example, memory drives that have been combined into an array may be replaced and repaired using one or more of the approaches described herein. These approaches are thereby desirably able to reduce write overhead, and data latency associated with recovering from drive failures by minimizing the number of data writes that are performed. For instance, by pre-formatting drives and reviewing the data being written thereto, approaches herein are able to significantly reduce write overhead associated with replacing a drive that has failed. Accordingly, data requests are satisfied with far less latency than conventionally achievable, while also ensuring high data availability.

In some implementations, the CIM includes initializing a high water mark in response to the blocks in the replacement drive being pre-formatted. Moreover, the high water mark is advanced to incorporate the corresponding blocks in the replacement drive. Accordingly, approaches herein are desirably able to keep track of which blocks in the replacement drive have been rebuilt and released. This allows for approaches herein to maintain an accurate understanding of which blocks in the replacement drive can be used to satisfy incoming data requests. As a result, performance of the system as a whole, particularly with respect to data latency, is significantly improved by the approaches herein.

Thus, in some implementations, the CIM also includes: determining whether referenced data in the recreated blocks is below the high water mark in response to receiving a data request introducing the referenced data. In response to determining the referenced data is below the high water mark, the corresponding blocks in the replacement drive are used to satisfy the data request. However, in response to determining the referenced data is above the high water mark, the remaining drives in the RAID array are used to satisfy the data request.

Again, approaches herein are thereby able to satisfy incoming data requests in an efficient manner, even in situations where one or more drives in a RAID array (or other type of "array" having drives therein) have failed. The high water mark allows for approaches herein to keep track of which blocks in the replacement drive have been fully reconstructed and thereby able to satisfy incoming data requests directly. As noted above, this improves performance of the system as a whole, particularly with respect to data latency.

In some implementations, recreating the blocks of data that were stored in a failed drive includes: performing an exposed mode read with zero detect operation on data stored in the remaining drives in the RAID array. In some instances, performing the exposed mode read with zero detect operation includes XORing the data stored in the remaining drives in the RAID array. In some instances, performing the exposed mode read with zero detect operation includes applying finite field multiplication to the data stored in the remaining drives in the RAID array. In some instances, performing the exposed mode read with zero detect operation includes: XORing the data stored in the remaining drives in the RAID array, and applying finite field multiplication to the data stored in the remaining drives in the RAID array.

It follows that depending on how the data is originally secured (e.g., stored) in a RAID array, the process of extracting desired data from remaining operational drives also varies. However, the exposed mode read with zero detect operation is desirably able to recover data that was at least temporarily lost as a result of the drive failure. This allows for the replacement drive to be rebuilt and used to satisfy received data requests.

In still other implementations, pre-formatting the blocks in the replacement drive includes deallocating all blocks in the replacement drive. Moreover, the drives in the RAID array include solid state drives (SSDs). It follows that approaches herein are desirably able to recover from drive failures with increased efficiency. This is achieved at least in part by reducing write overhead, and data latency associated with recovering from drive failures. This includes minimizing the number of data writes that are performed by pre-formatting drives and reviewing the data being written thereto. Again, this allows for approaches herein to significantly reduce write overhead associated with replacing a drive that has failed.

In another general approach, a CPP is for rebuilding a drive in a RAID array. The CPP includes: a set of one or more computer-readable storage media. The CPP also includes program instructions that are collectively stored in the set of one or more storage media, and are for causing a processor set to perform any combination(s) of the foregoing methodologies.

In another general approach, a CS is for rebuilding a drive in a RAID array. The CS includes a processor set and a set of one or more computer-readable storage media. The CS also includes program instructions that are collectively stored in the set of one or more storage media, and which are for causing the processor set to perform any combination(s) of the foregoing methodologies.

In still another general approach, a CIM is for rebuilding a drive in a RAID array. The CIM includes: initializing a high water mark in response to: a failed drive in the RAID array being replaced with a replacement drive, and a determination that the replacement drive cannot be pre-formatted. The CIM also includes recreating blocks of data that were stored in the failed drive. In response to determining one or more of the recreated blocks are not equivalent to deallocated blocks, data in the one or more recreated blocks is written to corresponding blocks in the replacement drive. However, in response to determining one or more of the recreated blocks are equivalent to deallocated blocks, the corresponding blocks in the replacement drive are deallocated. Furthermore, the high water mark is advanced to incorporate the corresponding blocks in the replacement drive.

It follows that approaches herein are desirably able to recover from drive failures with increased efficiency. For example, by determining whether a replacement drive can be pre-formatted, approaches herein are desirably able to reduce write overhead and data latency associated with recovering from drive failures. This is achieved by minimizing the number of data writes that are performed for the system as a whole, reducing write overhead associated with replacing a drive that has failed. Accordingly, data requests are satisfied by approaches herein with far less latency than conventionally achievable, while also ensuring high data availability.

In some implementations, the CIM also includes: determining whether referenced data in the recreated blocks is below the high water mark in response to receiving a data request introducing the referenced data. In response to determining the referenced data is below the high water mark, the corresponding blocks in the replacement drive are used to satisfy the data request. However, in response to determining the referenced data is above the high water mark, the remaining drives in the RAID array are used to satisfy the data request.

Again, approaches herein are thereby able to satisfy incoming data requests even in situations where one or more drives in a RAID array (or other type of "array" having drives therein) have failed. The high water mark allows for approaches herein to keep track of which blocks in the replacement drive have been fully reconstructed and thereby able to satisfy incoming data requests directly. As noted above, this improves performance of the system as a whole, particularly with respect to data latency.

In some implementations, data in the RAID array is protected using a scheme selected from the group consisting of: RAID 5, RAID 6, RAID 1/10, and erasure codes. Accordingly, recreating of the data stored in the failed drive includes: performing an exposed mode read with zero detect operation on data stored in the remaining drives in the RAID array. In some instances, performing the exposed mode read with zero detect operation includes XORing the data stored in the remaining drives in the RAID array. In some instances, performing the exposed mode read with zero detect operation includes applying finite field multiplication to the data stored in the remaining drives in the RAID array. In some instances, performing the exposed mode read with zero detect operation includes: XORing the data stored in the remaining drives in the RAID array, and applying finite field multiplication to the data stored in the remaining drives in the RAID array.

It follows that depending on how the data is originally secured (e.g., stored) in a RAID array, the process of extracting desired data from remaining operational drives also varies. However, the exposed mode read with zero detect operation is desirably able to recover data that was at least temporarily lost as a result of the drive failure. This allows for the replacement drive to be rebuilt and used to satisfy received data requests.

In yet another general approach, a CPP is for rebuilding a drive in a RAID array. The CPP includes: a set of one or more computer-readable storage media. The CPP also includes program instructions that are collectively stored in the set of one or more storage media, and which are for causing a processor set to perform any combination(s) of the foregoing methodologies.

In some implementations, a verified Host or application with access to a data stored in a RAID array may issue a data access request. The request references data stored at a logical location correlated with a physical location in a drive of the RAID array. In situations where the referenced drive is online and operational, the received request may be satisfied by simply accessing the drive. However, in situations where the referenced drive is offline, the requested data may not be easily accessible. Thus, in response to experiencing a drive failure, the failed drive is replaced with a replacement drive and rebuilt. Pre-formatting the blocks in the replacement drive (e.g., such that they are deallocated blocks) before completing the rebuild allows for write overhead and data latency associated with recovering from drive failures to be significantly reduced. For instance, pre-formatting the replacement drive allows for rebuilt data blocks that are equivalent to deallocated blocks to be simply skipped over during the rebuild process. Again, because the blocks of the replacement drive are pre-formatted (e.g., deallocated), no action is needed to update the replacement block for rebuilt blocks identified as being effectively deallocated, e.g., as would be appreciated by one skilled in the art after reading the present description.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the forego- ing. Some known types of storage devices that include these mediums include: diskette, hard disk, random access memory (RAM), read-only memory (ROM), erasable pro- grammable read-only memory (EPROM or Flash memory), static random access memory (SRAM), compact disc read- only memory (CD-ROM), digital versatile disk (DVD), SSDs, memory stick, floppy disk, mechanically encoded device (such as punch cards or pits/lands formed in a major surface of a disc) or any suitable combination of the fore- going. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other trans- mission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive meth- ods, such as improved data recovery code at block 150 for recovering from drive failures with increased efficiency. For example, memory drives that have been combined into an array may be replaced and repaired using one or more of the approaches described herein. Approaches are thereby desir- ably able to reduce write overhead, and data latency asso- ciated with recovering from drive failures. However, it should be noted that the approaches herein may be applied to any configuration of memory components used to store data e.g., such as redundant data drives storing backup (e.g., emergency) copies of data that are updated at times. For instance, by pre-formatting drives and reviewing the data being written thereto, approaches herein are able to signifi- cantly reduce write overhead associated with replacing a drive that has failed. Accordingly, data requests are satisfied with far less latency than conventionally achievable, while also ensuring high data availability, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including process- ing circuitry 120 and cache 121), communication fabric 111, volatile memory 112, persistent storage 113 (including oper- ating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop com- puter, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-imple- mented method may be distributed among multiple comput- ers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated inte- grated circuit chips. Processing circuitry 120 may imple- ment multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative prox- imity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the meth- ods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduc- tion path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models have more intense training phases using larger amounts of training data. Storing data in an efficient and effective manner has therefore been difficult to achieve.

While storing data in RAID configurations has been implemented in an effort to improve data availability, the drives in RAID arrays still experience failures over time. For example, drives are at an increased risk of failing while being powered down and powered back up. The drive itself may go through enhanced power on self-test that finds issues that would not normally be detected at runtime. Moreover, the likelihood of experiencing failure increases as the drives age. It follows that a power loss event across a full storage subsystem may cause one or more drives to fail when power is restored.

Depending on the RAID level, a RAID array may be able to survive one or more drive failures by rebuilding data from missing drive(s) using parity. It should be noted that "parity" as used herein is intended to include any desired type of literal parity information and/or any desired type (e.g., form) or redundancy data that may be used to improve data retention, e.g., as would be appreciated by one skilled in the art after reading the present description. While the data may ultimately be recovered, it is inaccessible from failed drives while recovering. Thus, data requests directed to the lost data are actually serviced by recreating the data from the remaining operational drives. This causes the data requests to be processed more slowly and inefficiently. This effectively causes the replacement drive to become a bottleneck while recovering from a drive failure in a RAID array. As noted above, the data in the lost drive is recovered from the remaining drives in the array, before being written back into the various blocks of a replacement drive. As drives become more complex and capable of storing more data, the process of recovering from failures has become more resource intensive. For example, the number of writes that are performed has a direct impact on the latency associated with bringing a replacement drive online. Furthermore, the data in a RAID array experiencing one or more drive failures is at greater risk of being permanently lost because of additional drive failures. Thus, the system is less protected during drive rebuilds, particularly in the event of experiencing another drive failure.

Accordingly, a need exists for an improved process of replacing failed drives in data storage systems that stores data across various drives. In sharp contrast to the short-comings experienced by conventional products, approaches herein are desirably able to recover from drive failures with increased efficiency. For example, drives that have been combined into one or more RAID arrays may be replaced and repaired using one or more of the approaches described herein. However, it should be noted that the approaches herein may be applied to any configuration of memory components used to store data e.g., such as redundant data drives storing backup (e.g., emergency) copies of data that are updated at times. For instance, by pre-formatting drives and reviewing the data being written thereto, approaches herein are able to significantly reduce write overhead associated with replacing a drive that has failed. Accordingly, data requests are satisfied with far less latency than conventionally achievable, while also ensuring high data availability, e.g., as will be described in further detail below.

Looking now to FIG. 2A, a system 200 having a distributed architecture is illustrated in accordance with one approach. For instance, the system 200 may include a clustered filesystem implemented therein. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central data storage location 202 that is connected to a first edge node 204, a second edge node 206, and a third edge node 208. Specifically, the central data storage location 202 and edge nodes 204, 206, 208 are connected to a network 210, and may thereby be positioned in different geographical locations. However, it should also be noted that two or more of the edge nodes 204, 206, 208 and/or central data storage location 202 may be connected differently depending on the approach. According to an example, two edge compute nodes may be located relatively close to each other and connected by a wired connection, e.g., a cable, a fiber-optic link, a wire, etc.; etc., or any other type of connection which would be apparent to one skilled in the art after reading the present description.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between the edge nodes 204, 206, 208 and/or central data storage location 202, regardless of the amount of separation which exists therebetween, e.g., despite being positioned at different geographical locations.

In some approaches, data may be sent between the edge nodes 204, 206, 208 and/or central data storage location 202 in response to requests received from running applications. In other approaches, data may be received at edge nodes 204, 206, 208 and/or central data storage location 202 from one or more other locations (not shown) that are also connected to network 210. Accordingly, each of the edge nodes 204, 206, 208 and central data storage location 202 include memory that is used to store data therein. For instance, edge nodes 204, 206, 208 include memory 218, 222, 226 and central data storage location 202 includes data storage array 214. In some approaches, the memory 218, 222, 226 at each of the respective edge nodes 204, 206, 208 include different drives. Similarly, the data storage array 214 at central data storage location 202 may include a number of data storage drives therein. Accordingly, data may be striped across the drives at each respective location in the system 200 in some approaches. In other approaches, data may be striped across the drives at two or more of the locations in system 200. In still other approaches, data may be striped across the drives of each of the locations in system 200. For example, RAID parity blocks may be striped across the various data storage drives in memory 218, 222, 226 and/or data storage array 214, e.g., as would be appreciated by one skilled in the art after reading the present description.

The edge nodes 204, 206, 208 are also shown as having a different configuration than the central data storage location 202. For example, in some implementations the central data storage location 202 includes a large (e.g., robust) processor 212 coupled to a cache 209 and a data storage array 214 having a relatively high storage capacity. The central data storage location 202 is thereby able to process and store a relatively large amount of data, allowing it to be connected to, and manage, multiple different remote edge nodes (also referred to herein as "nodes"). As noted above, the central data storage location 202 may receive data, commands, etc. from any number of locations. The components included in the central data storage location 202 thereby preferably have a higher storage capacity and throughput than components included in each of the edge nodes 204, 206, 208 to accommodate the higher flow of data experienced at the central data storage location 202.

The first edge node 204 includes a processor 216 coupled to memory 218. Similarly, edge node 206 includes a processor 220 coupled to memory 222, and edge node 208 includes a processor 224 coupled to memory 226. The memory implemented at each of the edge nodes 204, 206, 208 may be used to store data received from one or more sensors (not shown) in communication with the respective edge nodes, a user 215 and/or administrator 213 in communication with one or more of the edge nodes and/or central data storage location respectively, other ones of the edge nodes, different systems also connected to network 210, etc.

As alluded to above, the memory 218, 222, 226 at each of the respective edge nodes 204, 206, 208 may implement a respective portion of a shared or clustered filesystem. For example, each memory 218, 222, 226 may effectively serve as a point (e.g., node) in a RAID configuration or otherwise clustered filesystem. Each of these nodes may thereby store different portions of data and/or parity for other nodes such that the clustered filesystem is distributed across the system 200 in such a way that improves data retention, e.g., as would be appreciated by one skilled in the art after reading the present description. However, in other approaches one or more of the edge nodes 204, 206, 208 and/or central data storage location 202 may include a number of storage drives therein that create a RAID configuration at the respective location. For example, data storage location 202 may include a number of data storage (e.g., memory) drives in the data storage array 214 that together may be used to form a RAID array of a desired type.

It should also be noted that while the edge nodes 204, 206, 208 are depicted as including similar components and/or design, each of the edge nodes 204, 206, 208 may include any desired components which may be implemented in any desired configuration. In some instances, each edge node in a system may be configured differently to provide each location with a different functionality. According to an example, which is in no way intended to limit the invention, edge node 204 may include a cryptographic module (not shown) that allows the edge node 204 to produce encrypted data, while edge node 206 includes a data compression module (not shown) that allows the edge node 206 to produce compressed data.

It follows that the different edge nodes (e.g., servers) in system 200 may have different performance capabilities. As noted above, the central data storage location 202 may have a higher storage capacity compared to the edge nodes 204, 206. While this may allow the central data storage location 202 the ability to store more data than the edge nodes 204, 206, 208, other factors impact performance. For example, traffic over network 210 may limit the amount of data that may be sent from the edge nodes 204, 206, 208 to the central data storage location 202. The workload experienced at a given time also impacts latency and limits the achievable performance of the system 200.

In some approaches, the processor 212 may use the cache 209 and/or storage array 214 to actually cause one or more data operations to be performed. According to an example, the processor 212 at the central data storage location 202 may be used to perform data aware rebuilds of drives in an array while also reducing write overhead, e.g., by performing one or more of the operations in method 300 of FIG. 3A below.

It should be noted that with respect to the present description, "data" may include any desired type of information. For instance, in different implementations data can include raw sensor data, metadata, program commands, instructions, etc. The type of data storage components that are included in memory throughout system 200 may also vary depending on the approach. To provide a context, and solely to assist the reader, various approaches may be described with reference to a type of non-volatile memory. For example, various approaches herein are described in the context of memory having solid state drives (SSDs), but this has been done by way of example only, and should not be deemed limiting. For instance, memory 218, 222, 226, and/or 214 may include hard disk drives (HHDs), magnetic tape drives, etc. in other approaches. Moreover, SSDs may further include any desired type of non-volatile random access memory (NVRAM), e.g., such as NAND Flash memory, NOR Flash memory, phase-change memory (PCM), magnetoresistive RAM (MRAM), resistive RAM (RRAM), etc.

As mentioned above, NVRAM-based SSDs operate fundamentally differently from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations. This is due at least in part to the intrinsic properties of NVRAM memory such as NAND Flash. Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, e.g., as will be described in further detail below.

Figure 2B:
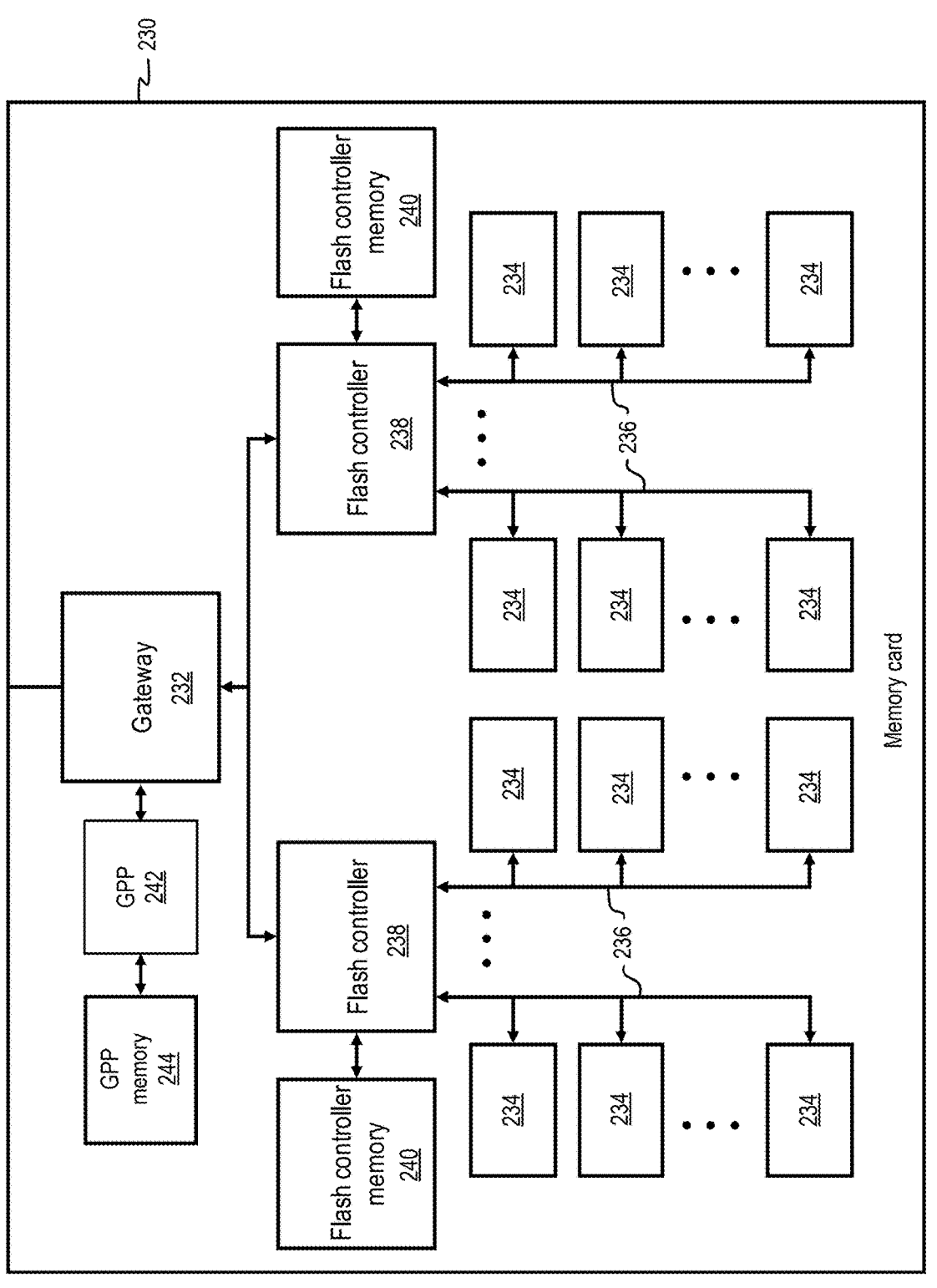
FIG. 2B is a diagram of a non-volatile memory card, in accordance with one approach.

Referring momentarily now to FIG. 2B, a memory card 230 is illustrated in accordance with one approach. One or more of the memory cards 230 may be used to form at least a portion of the data storage drives in system 200 of FIG. 2A. It should be noted that although memory card 230 is depicted as an exemplary non-volatile data storage card in the present approach, various other types of non-volatile data storage cards may be used in a data storage system according to alternate approaches. It follows that the architecture and/or components of memory card 230 are in no way intended to limit the invention, but rather have been presented as a non-limiting example.

Moreover, as an option, the present memory card 230 may be implemented in conjunction with features from any other approach listed herein, such as those described with reference to the other FIGS., e.g., such as FIG. 2A. However, such memory card 230 and others presented herein may be used in various applications and/or in permutations which may or may not be specifically described in the illustrative approaches listed herein. Further, the memory card 230 presented herein may be used in any desired environment.

As shown in FIG. 2B, memory card 230 includes a gateway 232, a general purpose processor (GPP) 242 (such as an ASIC, FPGA, CPU, etc.) connected to a GPP memory 244 (which may comprise RAM, ROM, battery-backed DRAM, phase-change memory PC-RAM, MRAM, STT-MRAM, etc., or a combination thereof), and a number of memory controllers 238, which include Flash controllers in the present example. Each memory controller 238 is connected to a plurality of NVRAM memory modules 234 (which may comprise NAND Flash or other non-volatile memory type(s) such as those listed above) via channels 236.

According to various approaches, one or more of the controllers 238 may be or include one or more processors, and/or any logic for controlling any subsystem of the memory card 230. For example, the controllers 238 typically control the functions of NVRAM memory modules 234 such as, data writing, data recirculation, data reading, etc. The controllers 238 may operate using logic known in the art, as well as any logic disclosed herein, and thus may be considered as a processor for any of the descriptions of non-volatile memory included herein, in various approaches.

Moreover, the controller 238 may be configured and/or programmable to perform or control some or all of the methodology presented herein. Thus, the controller 238 may be considered to be configured to perform various operations by way of logic programmed into one or more chips, modules, and/or blocks; software, firmware, and/or other instructions being available to one or more processors; etc., and combinations thereof.

Referring still to FIG. 2B, each memory controller 238 is also connected to a controller memory 240 which preferably includes a cache which replicates a non-volatile memory structure according to the various approaches described herein. However, depending on the desired approach, the controller memory 240 may be battery-backed DRAM, phase-change memory PC-RAM, MRAM, STT-MRAM, etc., or a combination thereof.

Figure 2C:
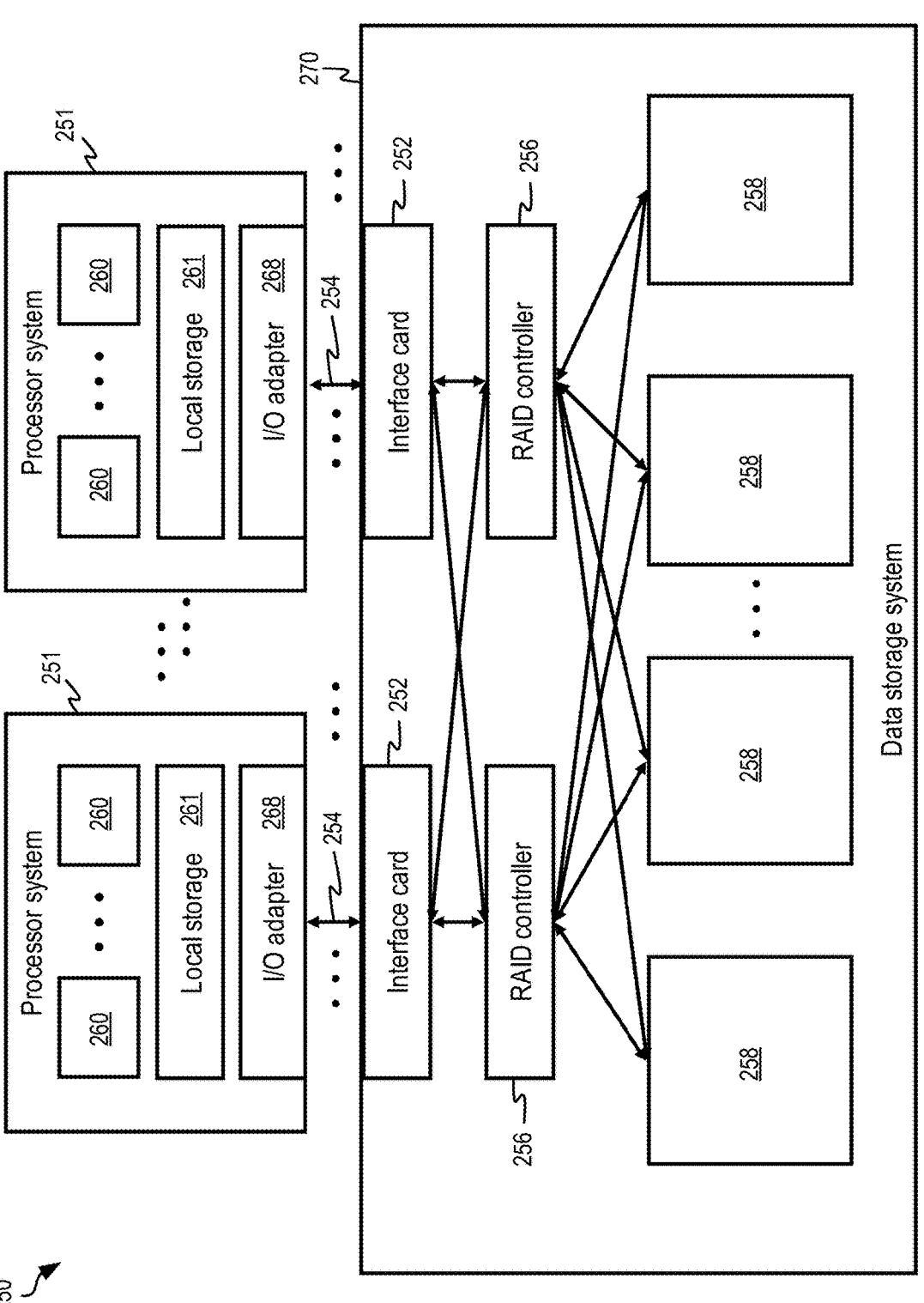
FIG. 2C is a diagram of a data storage system architecture, in accordance with one approach.

As previously mentioned, memory card 230 may be implemented in various types of data storage systems, depending on the desired approach. FIG. 2C illustrates a data storage system architecture 250 according to an exemplary approach which is in no way intended to limit the invention. Moreover, it should be noted that the data storage system architecture 250 of FIG. 2C may include various components found in the approach of FIG. 2B.

Looking to FIG. 2C, the data storage system 270 comprises a number of interface cards 252 configured to communicate via I/O interconnections 254 to one or more processor systems 251. The data storage system 270 may also comprise one or more RAID controllers 256 configured to control data storage in a plurality of non-volatile data storage cards 258. The non-volatile data storage cards 258 may comprise NVRAM, Flash memory cards, RAM, ROM, and/or some other known type of non-volatile memory.

The I/O interconnections 254 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof. Moreover, the RAID controller(s) 256 in the data storage system 270 may perform a parity scheme similar to that employed by RAID-5, RAID-6, RAID-10, or some other suitable parity scheme (e.g., such as Reed-Solomon based encoding), as would be understood by one of skill in the art upon reading the present descriptions. Each processor system 251 further includes one or more processors 260 (such as CPUs, microprocessors, etc.), local data storage 261, and an I/O adapter 268 configured to communicate with the data storage system 270.

Referring again to FIG. 2B, memory controllers 238, GPP 242, and/or other controllers described herein (e.g., RAID controllers 256 of FIG. 2C) may be able to perform various functions on stored data, depending on the desired approach. Specifically, memory controllers or GPP 242 may include logic configured to perform any one or more of the following functions, which are in no way intended to be an exclusive list. In other words, depending on the desired approach, logic of a storage system may be configured to perform additional or alternative functions, as would be appreciated by one skilled in the art upon reading the present description.

Garbage Collection

Garbage collection in the context of NVRAM based memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary approach, which is in no way intended to limit the invention, memory controllers (e.g., see controller 238 and/or GPP 242 of FIG. 2B) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat separation.

Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat separation when determining the heat of the memory block for some approaches. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat separation is two-fold. First, performing a garbage collection process on a hot memory block will prevent triggering the relocation of cold data as well. In the absence of heat separation, updates to hot data, which are performed frequently, also results in the undesirable relocations of all cold data collocated on the same LEB as the hot data being relocated. Therefore, the write amplification incurred by performing garbage collection is much lower for approaches implementing heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

Figures 2D, 2E:
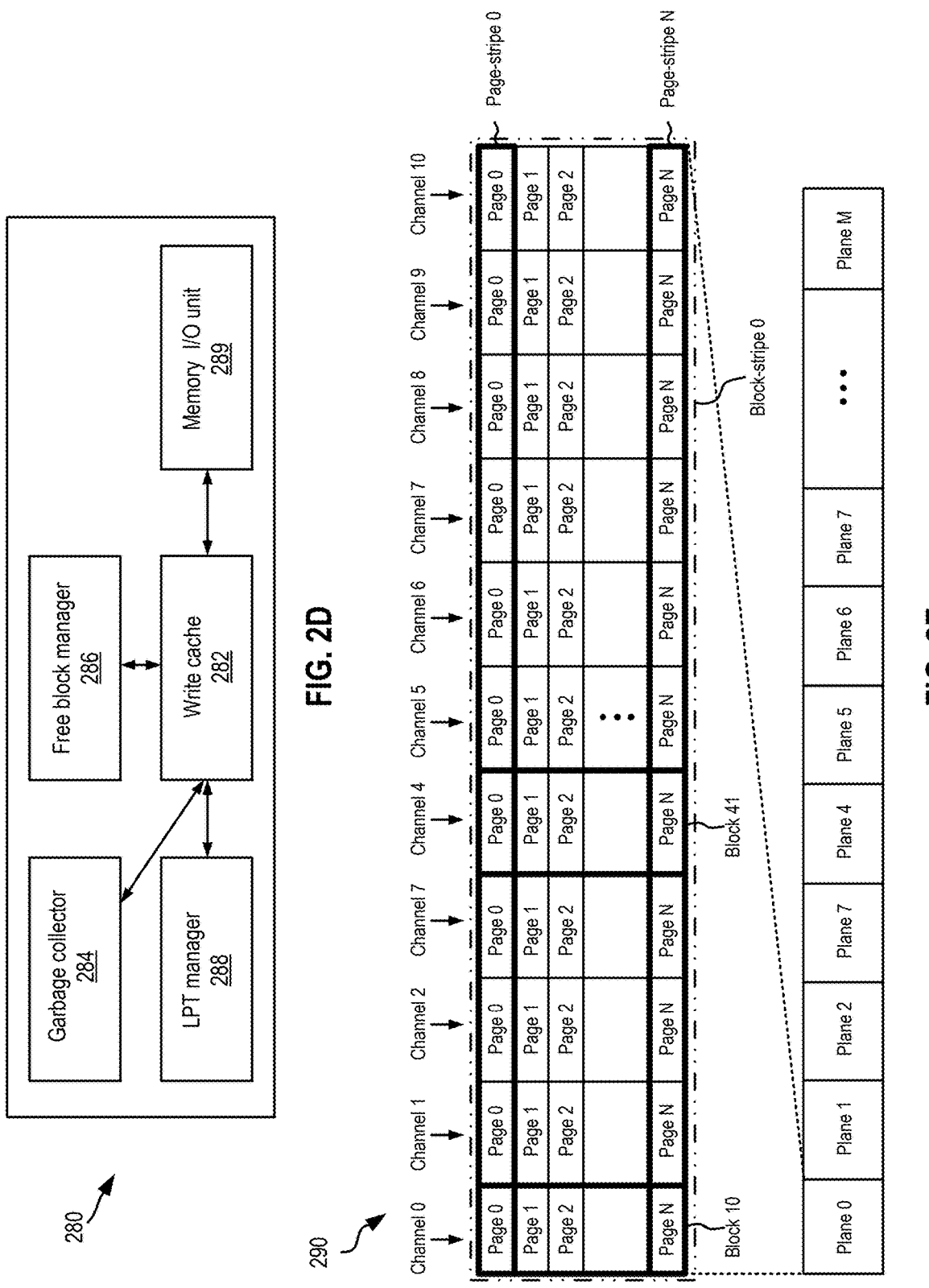
FIG. 2D is a storage system diagram, in accordance with one approach.
FIG. 2E is a conceptual diagram which includes a block-stripe and page-stripe, in accordance with one approach.

Referring now to FIG. 2D, a system 280 is illustrated in accordance with one approach. As an option, the present system 280 may be implemented in conjunction with features from any other approach listed herein, such as those described with reference to the other FIGS. However, such system 280 and others presented herein may be used in various applications and/or in permutations which may or may not be specifically described in the illustrative approaches listed herein. Further, the system 280 presented herein may be used in any desired environment, e.g., in combination with a controller.

As illustrated, system 280 includes a write cache 282 which is coupled to several other components, including garbage collector 284. As previously mentioned, garbage collector 284 may be used to free LEB units by relocating valid data and providing non-volatile memory blocks to be erased for later reuse. Thus, the garbage collector 284 may reclaim blocks of consecutive physical space, depending on the desired approach. According to an exemplary approach, block erase units may be used to keep track of and/or complete the erase of non-volatile memory blocks handed over by the garbage collector 284.

Write cache 282 is also coupled to free block manager 286 which may keep track of free non-volatile memory blocks after they have been erased. Moreover, as would be appreciated by one of ordinary skill in the art upon reading the present description, the free block manager 286 may build free stripes of non-volatile memory blocks from different lanes (e.g., block-stripes) using the erased free non-volatile memory blocks.

Referring still to FIG. 2D, write cache 282 is coupled to LPT manager 288 and memory I/O unit 289. The LPT manager 288 maintains the logical-to-physical mappings of logical addresses to physical pages in memory. According to an example, which is in no way intended to limit the invention, the LPT manager 288 may maintain the logical-to-physical mappings of 4 KiB or 16 KiB logical addresses. The memory I/O unit 289 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 2E is a conceptual diagram 290, in accordance with one approach. LEBs are built from block stripes and typically a single block stripe is used to build a LEB. However, alternative approaches may use multiple block stripes to form an LEB. As an option, the present conceptual diagram 290 may be implemented in conjunction with features from any other approach listed herein, such as those described with reference to the other FIGS. However, such conceptual diagram 290 and others presented herein may be used in various applications and/or in permutations which may or may not be specifically described in the illustrative approaches listed herein. Further, the controller conceptual diagram 290 presented herein may be used in any desired environment. Thus, the exemplary non-volatile memory controller conceptual diagram 290 of FIG. 2E may be implemented in a cache architecture. However, depending on the desired approach, the conceptual diagram 290 of FIG. 2E may be implemented in defining the organization of data stored in non-volatile memory. Accordingly, both implementations are described in turn below.

Non-Volatile Memory

Looking now to FIG. 2E, the conceptual diagram 290 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block in each channel may form a respective block-stripe. It follows that a number of block-stripes supported by a given approach of non-volatile memory may be determined by the number of blocks per plane and the number of planes.

In the exploded view of Plane 0, the conceptual diagram 290 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 290, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 2E, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 290, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 2E, the multiple blocks of aggregated Plane 0 constitute Block-stripe 0. While all blocks in a block-stripe typically belong to the same aggregated plane, in some approaches one or more blocks of a block-stripe may belong to different physical planes. It follows that each aggregated plane may include one or more block-stripes. Thus, according to an illustrative approach, Block 0 through Block 10 from different physical planes may constitute a block-stripe.

Regardless of whether the conceptual diagram 290 of FIG. 2E is implemented with non-volatile memory and/or a cache architecture, in different approaches, the number of pages in each block and/or the number of channels in each plane may vary depending on the desired approach. According to an exemplary approach, which is in no way intended to limit the invention, a block may include 256 pages, but could include more or fewer in various approaches. Analogously, the number of channels per plane and/or the number of planes may vary depending on the desired approach.

Referring still to FIG. 2E, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Figure 2F:
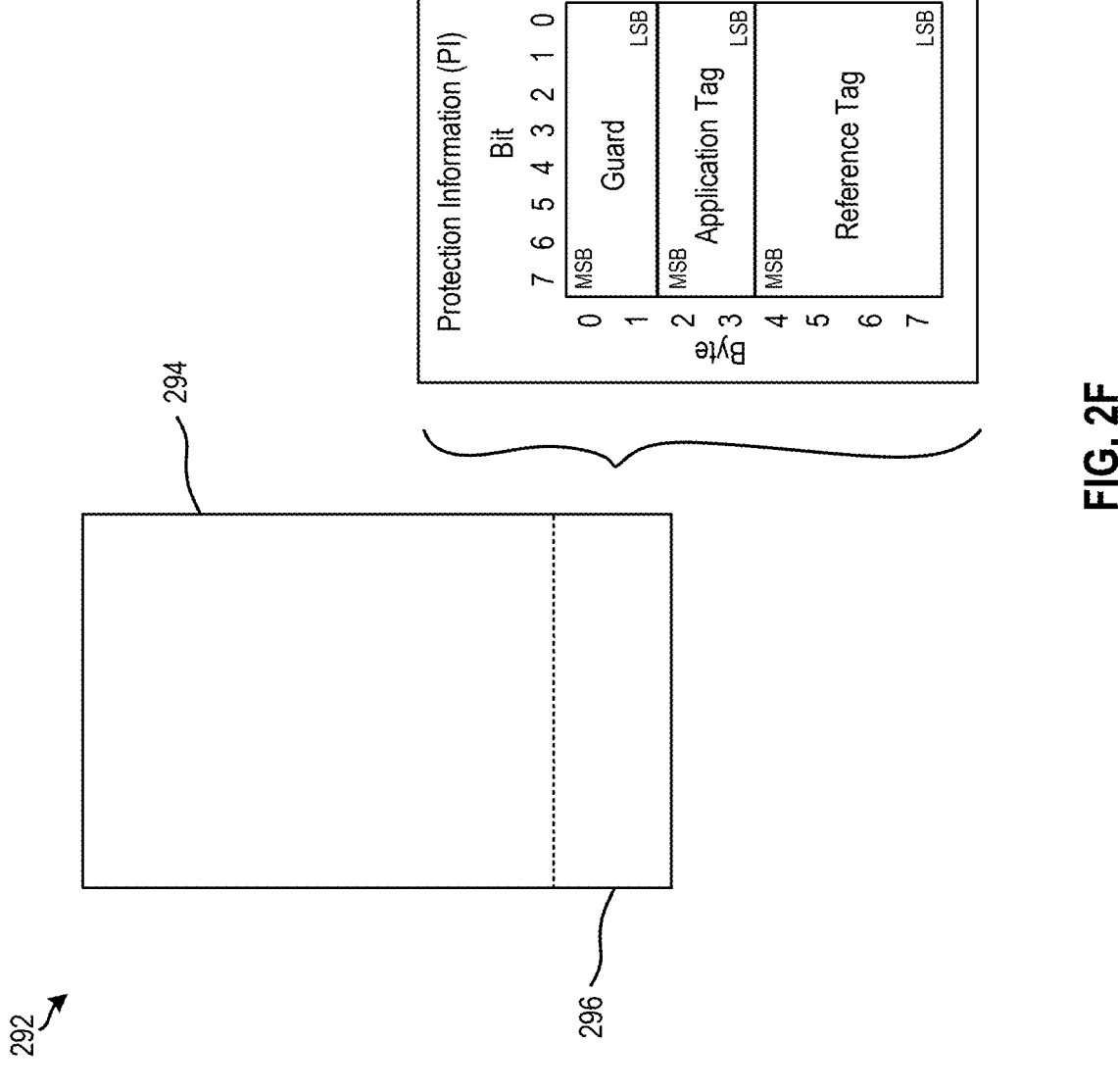
FIG. 2F is a partial representational view of a data block, in accordance with one approach.

Furthermore, FIG. 2F shows an exemplary detailed view of a data block 292. It follows that the details shown in data block 292 may be included in any of the memory blocks of FIG. 2E. The data block 292 includes a data portion 294 and a protected information portion 296. The size of the data portion 294 may vary depending on the approach and may be used to store a collection of data that is of a preferred size. However, the protected information portion 296 may be of a fixed size. For example, the protected information portion 296 is shown in accordance with an illustrative approach which is in no way intended to be limiting. As shown, the protected information is separated into a Guard section, an Application Tag section, and a Reference Tag section. The Reference Tag section may be used to uniquely identify the respective data block 292. Moreover, the Application Tag section may be used to identify one or more applications that correspond to the respective data block 292. Furthermore, the Guard section may be used to identify the transition between the data portion 294 and the protected information (e.g., metadata) portion 296.

As mentioned above, conventional products have suffered notable inefficiencies while attempting to recover from drive failure events. While attempting to recover from a drive failure in a RAID array, the replacement drive becomes a bottleneck for the data being replaced in the lost drive from the remaining operational drives. As drives become more complex and capable of storing more data, the process of recovering from failures in conventional products has become resource intensive. For example, the number of writes that are performed has had a significant impact on the duration associated with bringing a replacement drive online.

In sharp contrast to these conventional shortcomings, approaches herein have been able to successfully reverse these conventional shortcomings. For instance, FIG. 3A includes a flowchart of a computer-implemented method 300 for efficiently replacing and rebuilding at least one drive that has failed in a connected configuration. One or more of the operations in method 300 may thereby be performed to achieve data aware rebuilds of failed drives in an array while also reducing write overhead, e.g., as will be described in further detail below. Again, while various approaches herein are described in the context of SSD drives, any desired type of memory that implements a LPT may be implemented in the same or similar fashion. Accordingly, the method 300 may be performed in accordance with any of the approaches included herein in FIGS. 1-2F, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various approaches, the method 300 may be partially or entirely performed by a controller, a processor, a computer, etc., or some other device having one or more processors therein. Thus, in some approaches, method 300 may be a computer-implemented method. Moreover, the terms computer, processor and controller may be used interchangeably with regards to any of the approaches herein, such components being considered equivalents in the many various permutations of the present invention.

Accordingly, in some approaches at least some of the operations of method 300 may be performed by an AI model that is trained using a predetermined training set of data. For example, in some approaches, various of the operations noted above may be deployed in a trained state of a trained AI model. Training of the AI model, in some approaches, may be performed by applying a predetermined training data set to learn how to recover from failed drive conditions. Predetermined training data sets may also be applied to learn how to automatically generate the data lost from a failed drive and begin refilling a replacement drive as soon as it is installed. Initial training may include reward feedback that may, in some approaches, be implemented using a subject matter expert (SME) that generally understands reforming data after drive loss, e.g., using RAID parity. However, to prevent costs associated with relying on manual actions of a SME, in another approach, reward feedback may be implemented using techniques for training a BERT model, as would become apparent to one skilled in the art after reading the present disclosure. Once a determination is made that the AI model achieves a redeemed threshold of accuracy of performing the operations described herein during this training, a decision that the model is trained and ready to deploy for performing at least some of the techniques and/or operations of method 300 may be performed. In some further approaches, the AI model may be a neuromyotonic AI model that may improve performance of computer devices in an infrastructure associated with data management in RAID arrays, because the neuromyotonic AI model may not need an SME and/or iteratively applied training with reward feedback in order to accurately perform operations described herein. Instead, the neuromyotonic AI model is configured to itself make determinations described in operations herein. Weight values may, in some approaches, be used by the AI reasoning model to collect and analyze information and/or feedback potentially received from data storage environment. Such an AI model ensures that failed drives and the data stored therein are recovered. The AI model(s) may also ensure that runnable exploit scripts that incorporate drive replacement and data rebuilding are automatically generated and tested, where the scale of such analysis and determinations would not otherwise be feasible for a human to perform. This is because humans are not able to efficiently do so, and would otherwise incorporate processing delays and errors in the process of performing the approaches included herein. Accordingly, management of operations described herein is not able to be achieved by human manual actions.

Moreover, for those approaches having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Figure 3A:
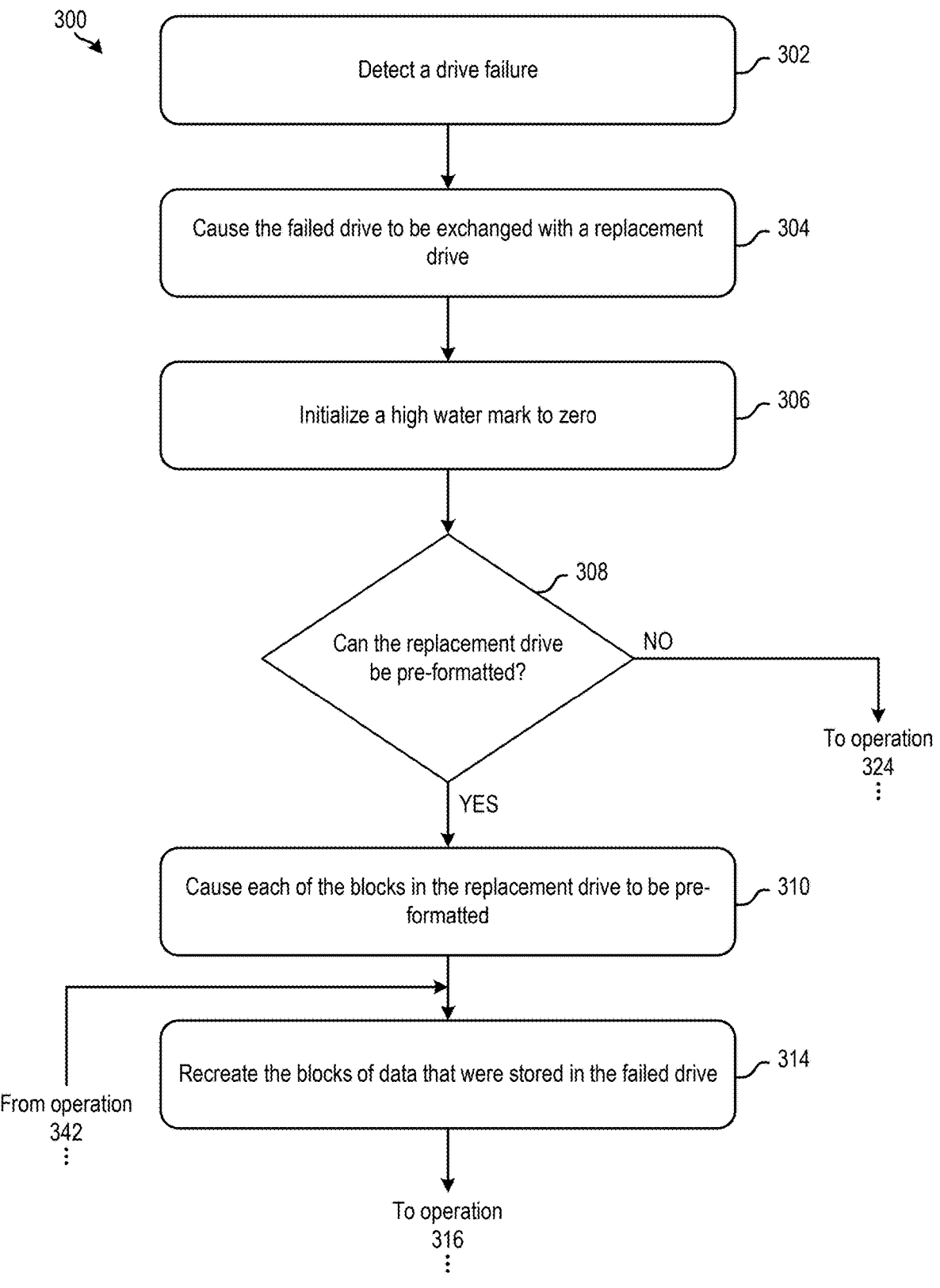
FIG. 3A is a flowchart of a method, in accordance with one approach.
Figure 3A:
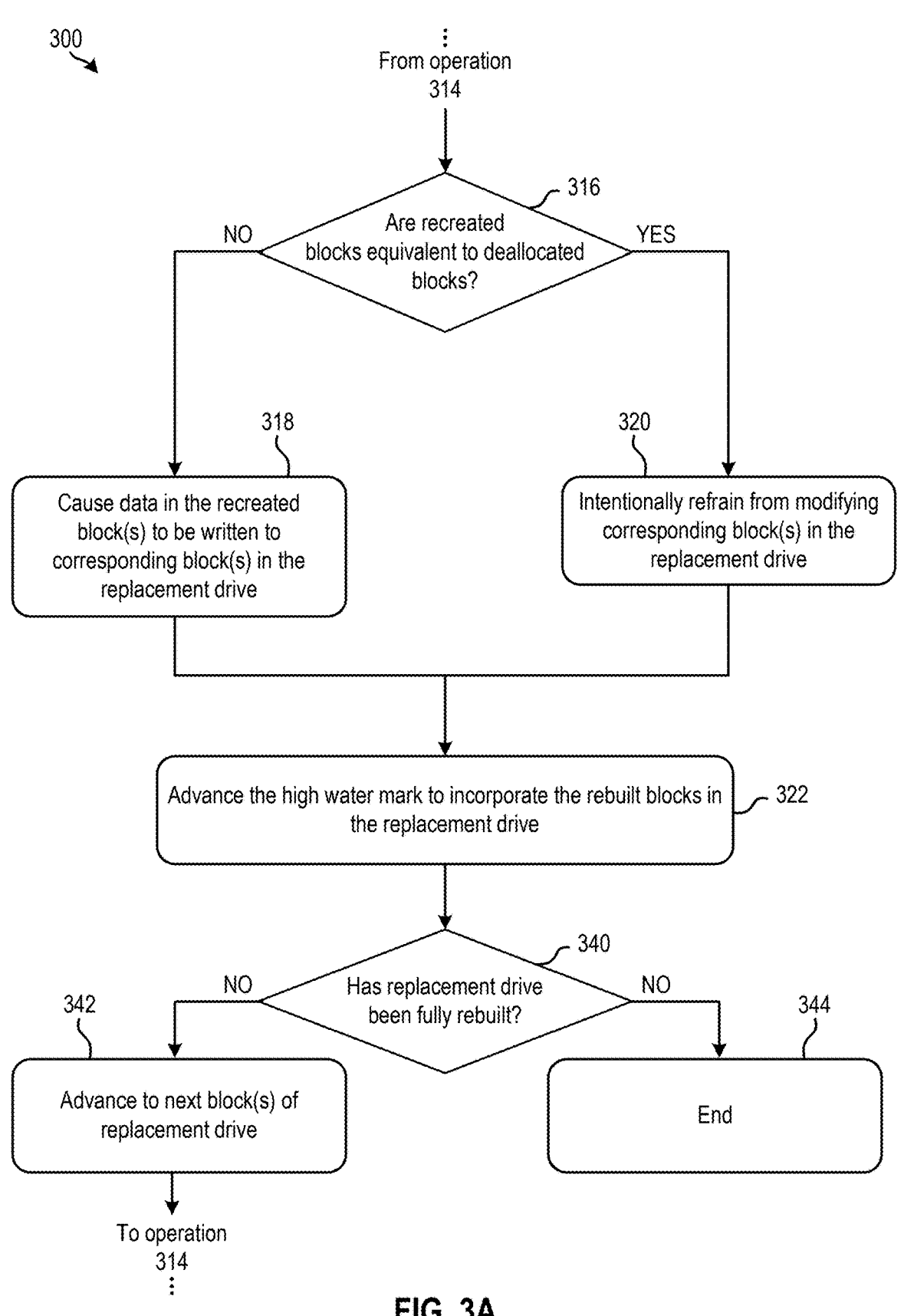
Figure 3A:
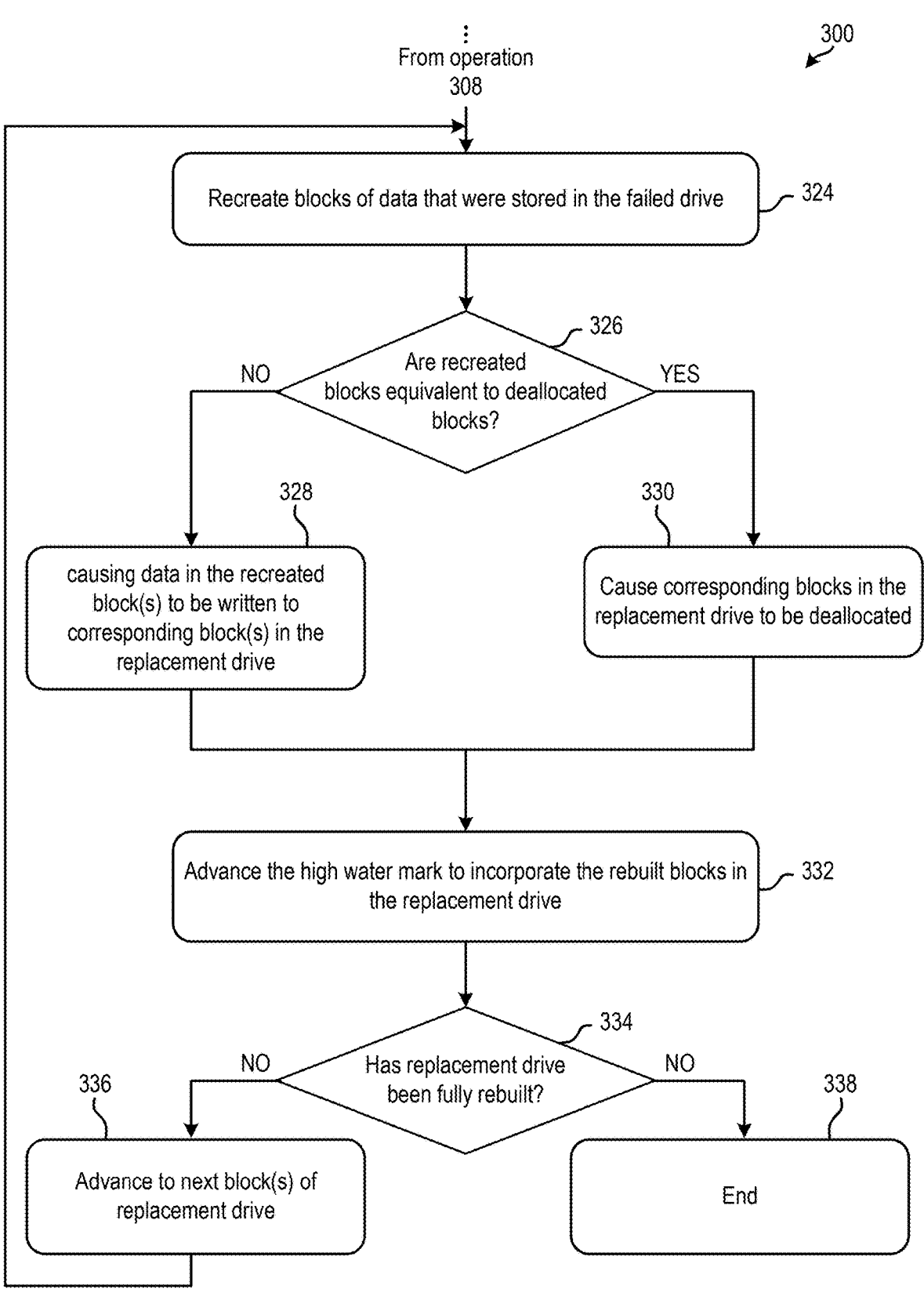

As shown in FIG. 3A, a drive failure is detected at operation 302. Depending on the approach, the drive failure may be detected automatically in response to the drive going offline. In other approaches, a drive failure may be detected in response to a predetermined number of data requests failing, in response to a timeout being observed, etc. The drive failure may also be caused by a number of different reasons depending on the approach. For instance, in some approaches a data storage drive may fail as a result of being powered off and back on, undergoing a software update, experiencing a sudden power loss, being targeted by malicious programs and/or actions, etc.

While certain RAID configurations may allow for more than one drive failure to occur before performance is affected or data is lost, it may be desirable that failed drives begin to be replaced as soon as they are detected. This desirably reduces the chance of experiencing system downtime. However, in other approaches the replacement of failed drives may be delayed and performed during times of low system throughput to reduce overall latency experienced. In still other approaches, the benefits and drawbacks of replacing failed drives sooner rather than waiting for opportune times to do so may be weighed to identify an "ideal" point to replace failed drives. In some approaches, one or more AI based models may be trained.

From operation 302, method advances to operation 304. There, operation 304 includes causing the failed drive to be replaced (e.g., exchanged) with a replacement drive. In some approaches, the replacement drive is the same type (e.g., configuration) as the failed drive, e.g., in order to maintain the performance characteristics of the drive and/or an overarching array of drives. In other approaches, the replacement drive may have different performance characteristics than the failed drive being replaced. This may allow for capabilities of the drive and/or larger array to be adjusted based on the particular implementation and as it changes over time. Moreover, in some approaches operation 304 is performed by sending one or more instructions to a drive replacement module (not shown), an administrator, a drive manufacturer, etc.

Method 300 advances from operation 304 to operation 306. There, operation 306 includes initializing a high water mark to zero. In other words, operation 306 includes initializing a reference point that can be used to keep track of which blocks in the replacement drive have been rebuilt. The high water mark may be represented logically and/or physically as desired using one or more pointers, flags, appended metadata, information stored within the RAID Controller and/or Memory Blocks (e.g., see 256 and/or 258 of FIG. 2C), etc.

From operation 306, method advances to operation 308 in response to the failed drive being replaced with a replacement drive and the high water mark being initialized. There, operation 308 includes determining whether the replacement drive can be pre-formatted. In other words, operation 308 includes determining whether formatting changes may be made to the memory blocks in the replacement drive before the drive is applied (e.g., actually used). According to an example, operation 308 may determine whether blocks in the replacement drive may be deallocated as a pre-formatting step before using (e.g., actually filling the LPT table) the replacement drive.

In some approaches, operation 308 may be determined by actually inspecting the replacement drive taking the place of the failed drive. In other approaches, information about the replacement drive may be shared during the process of exchanging it with the failed drive. According to an example, metadata such as formatting settings, user preferences, runtime performance, etc., may be downloaded from an internal memory of the failed drive and used to determine one or more settings in the replacement drive.

As shown, method 300 advances to operation 310 in response to determining that the replacement drive can be pre-formatted. It follows that method 300 advances to operation 310 in response to a failed drive being replaced with a replacement drive as well as determining that the replacement drive can be pre-formatted. There, operation 310 includes causing each of the blocks in the replacement drive to be pre-formatted. Alternatively, method 300 advances to operation 324 in response to determining the replacement drive cannot be pre-formatted. In other words, method 300 advances to operation 324 in response to a failed drive being replaced with a replacement drive in addition to determining that the replacement drive cannot be pre-formatted, e.g., as described in further detail below.

The pre-formatting performed in the replacement drive as a result of running operation 310 preferably results in the blocks of the replacement drive being uniform and primed to perform a reconstruction of the failed drive. According to preferred approaches, which are in no way intended to be limiting, performing operation 310 results in each of the blocks in the replacement drive being deallocated. It follows that operation 310 may include sending one or more instructions that cause each of the blocks in the replacement drive to be filled with logical zeros indicating that the respective blocks are currently deallocated. However, it should be noted that the blocks of the replacement drive may be pre-formatted as desired depending on the approach. Pre-formatting the blocks of the replacement drive as described herein thereby allows for the drive rebuild process to be performed more efficiently, e.g., as will soon become apparent.

A deallocated block in SSD corresponds to an entry in the LPT that does not associate the logical block with any physical page. A deallocated block may also be referred to as a trimmed block, an unmapped block, etc. Deallocated blocks reduce physical Flash memory usage in the SSD. When an SSD is pre-formatted, all logical blocks are preferably deallocated.

From operation 310, method 300 advances to operation 314. There, operation 314 includes recreating at least some of the blocks of data that were stored in the failed drive. In other words, operation 314 includes rebuilding at least some of the data that was lost as a result of the drive failure. In preferred approaches, data storage drives implement data retention measures, e.g., such as storing data in a RAID array. Accordingly, even when one or more drives in the RAID array have failed and the corresponding data has been at least temporarily lost, data, including parity, stored in the remaining drives in the RAID array may be used to recreate the data in the failed drives.

It follows that in some approaches, operation 314 includes performing an exposed mode read with zero detect operation on data stored in the remaining drives of a RAID array experiencing at least one drive failure. The exposed mode read with zero detection operation may vary depending on the RAID configuration, data being rebuilt, number of drive failures experienced, etc. For instance, the data stored in a RAID array may be protected using one or more schemes. A non-limiting list of possible "schemes" that may be used to protect the data stored in a RAID array as described herein includes RAID 5, RAID 6, RAID 1/10, erasure codes, etc. For instance, approaches that implement RAID 5 use parity to tolerate up to a single drive failure while remaining operational. Approaches that implement RAID 6 schemes use either multiple sets of parity, Reed Solomon encoding, or other redundancy to tolerate up to two drive failures while remaining operational. Approaches that implement erasure codes may implement schemes that are "beyond RAID 6", having N sets of redundancy data thereby allowing the array to tolerate up to N drive failures while remaining operational. There are performance and reliability trade-offs associated with implementing data protection schemes, but eventually as drives get larger and rebuilds take longer, solutions will likely employ erasure codes to tolerate more concurrent failures. It follows that, in some approaches the exposed mode read with zero detect operation includes XORing the data stored in the remaining operational drives in the RAID array. This produces the data lost as a result of the drive(s) failing. In other approaches, the exposed mode read with zero detect operation includes XORing the data in the remaining operational drives of the RAID array, as well as applying finite field multiplication to the data in the remaining operational drives.

Again, at least some of the data lost as a result of the drive failure experienced (e.g., identified) at operation 302 is rebuilt as a result of performing operation 314. In some approaches, data for a predetermined number of blocks (e.g., 1, 2, 3, 4, 5, 6, 7, 8, 9, 10, 15, 20, 25, 30, 50, 100, etc. blocks) may be rebuilt from the remaining operational drives each time operation 314 is performed. It follows that the operations of method 300 may be repeated any desired number of times to rebuild the data from the failed drive incrementally, e.g., as would be appreciated by one skilled in the art after reading the present description.

Method 300 advances from operation 314 to operation 316 where the rebuilt data is examined. As shown, operation 316 includes determining whether any of the recreated blocks are equivalent to deallocated blocks. In other words, operation 316 examines the blocks of data rebuilt (e.g., recreated) in operation 314 and determines whether any of them are filled with all logical zeros (except the respective Protection Information—e.g., see FIG. 2F). It follows that operation 316 may evaluate any desired number of the recreated blocks. In some approaches, each recreated block is evaluated independently. Thus, one or more of the operations in method 300 may be repeated (e.g., in an iterative fashion) for each block of the recreated data. In other approaches, groupings of the recreated blocks (e.g., blocks having the same general formatting) may be evaluated together.

In response to determining a recreated block is not equivalent to a deallocated block (e.g., contains valid data), method 300 advances from operation 316 to operation 318. There, operation 318 includes causing data in the recreated block to be written to a corresponding block in the replacement drive. Operation 318 thereby uses the valid data in a recreated block to fill a corresponding one of the blocks in the replacement drive. As a result, the block in the replacement drive reflects a corresponding block of data in the failed drive before being lost. While this desirably results in the replacement drive accurately reflecting the data in the failed drive, the process of writing the data to the replacement drive blocks adds write overhead to the system.

Thus, returning to operation 316, method 300 advances to operation 320 in response to determining that the recreated block being evaluated is equivalent to a deallocated block. In other words, method 300 advances to operation 320 in response to identifying a recreated block that does not contain any valid data. There, operation 320 includes intentionally refraining from modifying corresponding blocks in the replacement drive. Thus, by identifying such blocks of data in the data recreated from the drive failure, method 300 is able to avoid writing any data to the corresponding blocks in the replacement drive. Again, because a deallocated block does not contain any valid data, the corresponding block in the replacement drive is not modified from the deallocated state set in operation 310 above. Moreover, by intentionally refraining from performing any modifications (e.g., writes) at the replacement drive for such blocks in the rebuilt data identified as being deallocated, method 300 is able to significantly reduce the write overhead experienced by the system while recovering from the drive failure. Thus, reducing the number of writes that are performed while also ensuring the replacement drive accurately reflects the data in the failed drive achieves repair of the array in a most efficient manner, e.g., as would be appreciated by one skilled in the art after reading the present description.

If a logical block is read by the user of the SSD, and the logical block is deallocated, then zeroed data is returned. Deallocated blocks thereby extend the life of memory by reducing the number of program/erase cycles that are performed by the controller. Deallocated blocks also improve performance by reducing garbage collection performed by the controller. SSDs commonly implement a zero detect of data being written such that if the user of the SSD writes all zero data to a logical block, then the block will be deallocated rather than writing zero data to a memory page. However, if a logical block is written with all zeroed data except for non-zero field in the Protection Information (e.g., see FIG. 2F), such as the Reference Tag, then the SSD zero detect will not be useful.

Method 300 advances to operation 322 from both operation 318 and 320 as shown. There, operation 322 includes advancing the high water mark to incorporate the corresponding blocks in the replacement drive rebuild (e.g., reformed) as a result of operation 318 or 320. In other words, operation 322 increments the high water mark such that it passes the one or more recreated blocks that have been evaluated and accurately represented in the replacement drive as a result of reaching operation 322. This desirably allows for the high water mark to accurately reflect the block(s) that have already been rebuilt and validated. As a result, data requests that reference data in blocks of the replacement drive that are "below" the high water mark (have already been rebuilt) may be processed by the replacement drive, even while other blocks of the replacement drive are still being rebuilt.

Figure 3B:
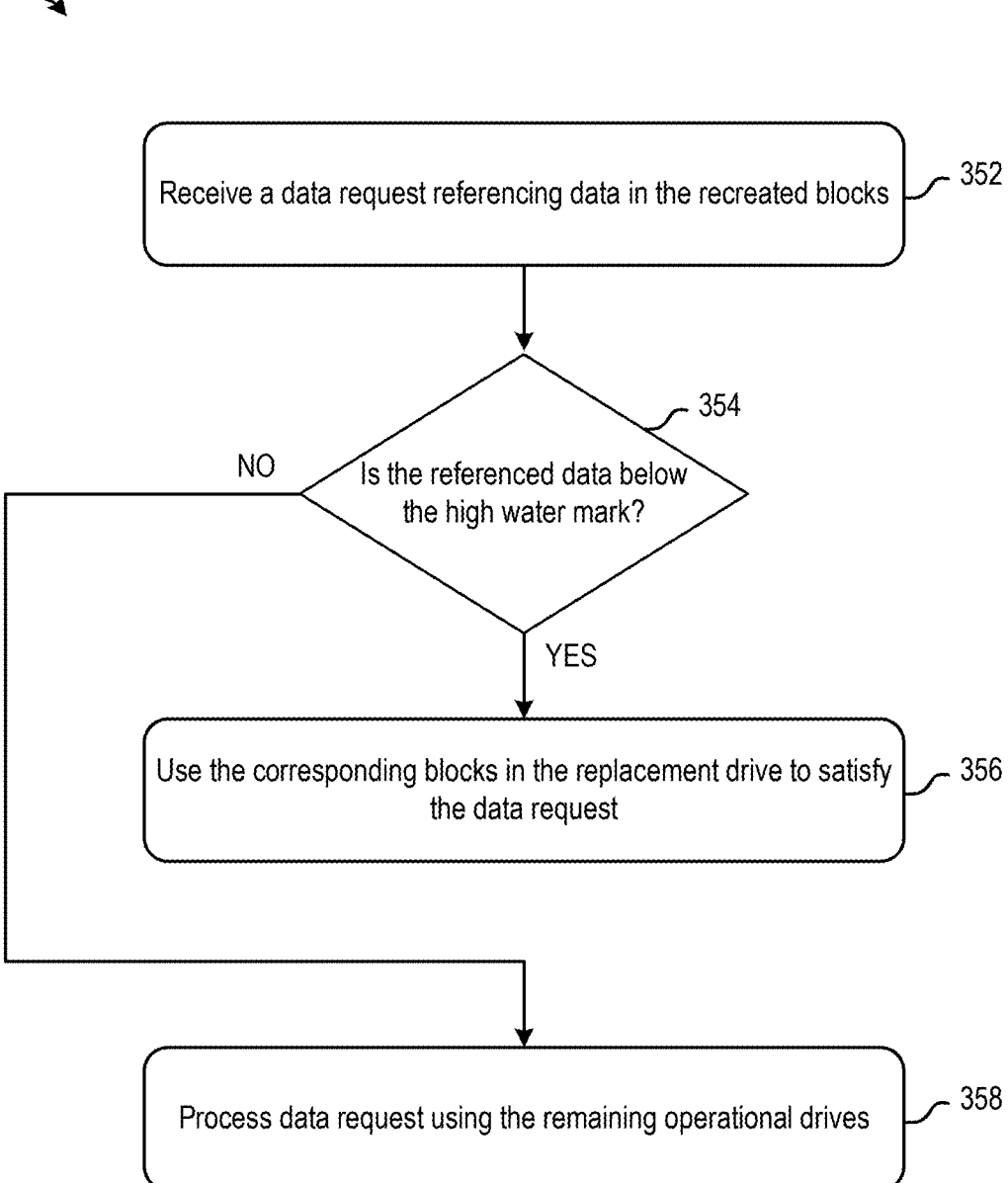
FIG. 3B is a flowchart of a process, in accordance with one approach.

For instance, referring momentarily to FIG. 3B, exemplary sub-operations of a process 350 for satisfying requests referencing data included in one or more failed drives is illustrated in accordance with one approach. It follows that one or more of these sub-operations in process 350 may be used to satisfy at least some data requests that are received while a replacement drive is being rebuilt and brought online. Accordingly, the sub-operations of process 350 may be performed in the background while rebuilding the replacement drive, e.g., in response to receiving a data request. However, it should be noted that the sub-operations of FIG. 3B are illustrated in accordance with one approach which is in no way intended to limit the invention.

As shown, sub-operation 352 includes receiving a data request referencing data in the recreated blocks. In other words, sub-operation 352 includes receiving a data request that involves accessing data that was stored in the failed drive, and is now being rebuilt in the replacement drive. Proceeding to sub-operation 354, there the received data request is evaluated, and a determination is made as to whether the referenced data is below the high water mark in the replacement drive. As noted above, the high water mark may be used to represent the transition between: (i) blocks of data that accurately reflect the blocks in the failed drive, and (ii) blocks of data that have not yet been rebuilt but which may be deallocated (e.g., see operation 310 in FIG. 3A above). Thus, by determining whether a received data request involves block(s) above or below the high water mark, process 350 is able to satisfy requests during the rebuild process.

Accordingly, the flowchart advances from sub-operation 354 to sub-operation 356 in response to determining that the referenced data is below the high water mark. There, sub-operation 356 includes using the corresponding blocks in the replacement drive to satisfy the data request. In other words, sub-operation 356 uses the blocks in the replacement drive as if the replacement drive itself were online and processing data requests. Again, this desirably allows for at least some of the requests received during the drive rebuild process to be processed, thereby reducing latency while also achieving reduced write overhead during the rebuild process.

However, the flowchart proceeds from sub-operation 354 to sub-operation 358 in response to determining the referenced data is not below the high water mark. In other words, process 350 advances to sub-operation 358 in response to determining blocks in the replacement drive referenced by a received data request have not yet been rebuilt. There, sub-operation 358 includes processing the received data request using the remaining operational drives. In other words, because the requested data has not yet been rebuilt and added to the replacement drive, sub-operation 358 includes reconstructing the requested data from the remaining operational drives to satisfy the request. In some approaches, sub-operation 358 includes processing a data request in "exposed mode," e.g., as would be appreciated by one skilled in the art after reading the present description. It follows that each data request can be satisfied, even while still rebuilding a failed drive. Even in situations where a data request is made to write data that is missing and currently being rebuilt, the request is simply held off until the corresponding data is rebuilt in the replacement drive. However, this is a short period of time.

Returning now to FIG. 3A, method 300 advances from operation 308 to operation 324 in response to determining the replacement drive cannot be pre-formatted. While pre-formatting (e.g., deallocating blocks in) the replacement drive allows for write overhead to be reduced, not all drives are capable of implementing pre-formatting. Thus, operation 324 includes recreating blocks of data that were stored in the failed drive. It follows that method 300 advances to operation 324 in response to a failed drive being replaced with a replacement drive as well as determining that the replacement drive cannot be pre-formatted.

Operation 324 includes rebuilding the data that was lost as a result of the drive failure. In preferred approaches, data storage systems implement data retention measures, e.g., such as storing data in a RAID array. Accordingly, even when one or more drives in the RAID array have failed and the corresponding data has been at least temporarily lost, data (e.g., parity) stored in the remaining drives in the RAID array may be used to recreate the data in the failed drives. It should also be noted that operation 324 may be performed using any one or more of the approaches described above with respect to operation 314, e.g., as would be appreciated by one skilled in the art after reading the present description. Accordingly, data for a predetermined number of blocks (e.g., 1, 2, 3, 4, 5, 6, 7, 8, 9, 10, 15, 20, 25, 30, 50, 100, etc. blocks) may be rebuilt from the remaining operational drives each time operation 324 is performed. Again, ones of the operations in method 300 may be repeated any desired number of times to rebuild the data from the failed drive incrementally, e.g., as would be appreciated by one skilled in the art after reading the present description.

From operation 324, method 300 advances to operation 326. There, operation 326 includes examining the rebuilt data and determining whether each of the recreated blocks are equivalent to deallocated blocks. In other words, operation 326 examines the blocks of data rebuilt (e.g., recreated) in operation 324 and determines whether any of them are filled with all logical zeros (except the respective Protection Information—e.g., see FIG. 2F). It follows that operation 326 may evaluate any desired number of the recreated blocks. In some approaches, each recreated block is evaluated independently. Thus, one or more of the operations in method 300 may be repeated (e.g., in an iterative fashion) for each block of the recreated data. In other approaches, groupings of the recreated blocks (e.g., blocks having the same general formatting) may be evaluated together.

In response to determining one or more given recreated block is not equivalent to a deallocated block (e.g., contains valid data), method 300 advances from operation 326 to operation 328. There, operation 328 includes causing data in the given recreated block(s) to be written to corresponding blocks in the replacement drive. Operation 328 thereby uses the valid data in the recreated blocks to fill corresponding one(s) of the blocks in the replacement drive. As a result, the block(s) in the replacement drive reflect corresponding block(s) of data in the failed drive before being lost.

Alternatively, method 300 advances from operation 326 to operation 330 in response to determining that one or more of the recreated blocks are equivalent to deallocated blocks. There, operation 330 includes causing corresponding blocks in the replacement drive to be deallocated. In other words, operation 330 includes sending one or more instructions to the one or more blocks of the replacement drive evaluated in operation 326, that result in the one or more blocks being deallocated. In preferred approaches, the one or more blocks are filled with logical zeros as a result of performing operation 330. As noted above, blocks filled with logical zeros may be understood (e.g., predefined) as representing a block that is currently deallocated, thereby improving performance further.

Method 300 advances to operation 332 from both operation 328 and 330 as shown. There, operation 332 includes advancing the high water mark to incorporate the corresponding blocks in the replacement drive reformed as a result of operation 328 or 330. In other words, operation 332 increments the high water mark such that it passes the one or more recreated blocks that have been evaluated and accurately represented in the replacement drive as a result of reaching operation 332. This desirably allows for the high water mark to accurately reflect the block(s) that have already been rebuilt and validated. As a result, data requests that reference data in blocks of the replacement drive that are "below" the high water mark (have already been rebuilt) may be processed even while other blocks of the replacement drive are still being rebuilt.

From operation 332, method 300 advances to operation 334. There, operation 334 determines whether the replacement drive has been fully rebuilt. In response to determining the replacement drive has not yet been fully rebuilt, method 300 advances from operation 334 to operation 336. There, operation 336 includes advancing to a next block(s) of the replacement drive for evaluation and rebuild before returning to operation 324. Accordingly, a next set of data may be rebuilt and examined for equivalence to deallocated blocks of data, e.g., as described herein. It follows that at least some of the operations in method 300 may be repeated for each block of a replacement drive during a rebuild process.

However, method 300 advances from operation 334 to operation 338 in response to determining the replacement drive has been fully rebuilt. There, method 300 may end. However, it should be noted that although method 300 may end upon reaching operation 338, any one or more of the processes included in method 300 may be repeated in order to recover from other failed drives. In other words, any one or more of the processes included in method 300 may be repeated in order to recover from any drive failures experienced in a RAID array, e.g., as described herein. It should also be noted that multiple instances of method 300 may be run in parallel to rebuild multiple drives in an overlapped (e.g., simultaneous) fashion.

Similarly, method 300 advances from operation 322 to operation 340. There, operation 340 determines whether the replacement drive has been fully rebuilt. In response to determining the replacement drive has not yet been fully rebuilt, method 300 advances from operation 340 to operation 342. There, operation 342 includes advancing to a next block(s) of the replacement drive for evaluation and rebuild before returning to operation 314. Accordingly, a next set of data may be rebuilt and examined for equivalence to deallocated blocks of data, e.g., as described herein. It follows that at least some of the operations in method 300 may be repeated for each block of a replacement drive during a rebuild process.

However, method 300 advances from operation 340 to operation 344 in response to determining the replacement drive has been fully rebuilt. There, method 300 may end. However, it should be noted that although method 300 may end upon reaching operation 344, any one or more of the processes included in method 300 may be repeated in order to recover from other failed drives. In other words, any one or more of the processes included in method 300 may be repeated in order to recover from any drive failures experienced in a RAID array, e.g., as described herein. It should also be noted that multiple instances of method 300 may be run in parallel to rebuild multiple drives in an overlapped (e.g., simultaneous) fashion.

As described above, a need exists for an improved process of replacing failed drives in data storage systems that stores data across various drives. In sharp contrast to the shortcomings experienced by conventional products, approaches herein are desirably able to recover from drive failures with increased efficiency. For example, memory drives that have been combined into one or more RAID arrays may be replaced and repaired using one or more of the approaches described herein. It follows that the operations of method 300 are desirably able to reduce write overhead and data latency associated with recovering from drive failures. However, it should be noted that the approaches herein may be applied to any configuration of memory components used to store data e.g., such as redundant data drives storing backup (e.g., emergency) copies of data that are updated at times. For instance, by pre-formatting drives and reviewing the data being written thereto, approaches herein are able to significantly reduce write overhead associated with replacing a drive that has failed. Accordingly, data requests are satisfied with far less latency than conventionally achievable, while also ensuring high data availability.

For instance, once a failed drive (e.g., physical device) is replaced, a rebuild operation recreates the data stored on the failed drive in units of a stripe size (e.g., 256 KB on each drive), while advancing a high water mark. It should be noted that approaches implementing RAID may be able to perform rebuilds with up to 16 overlapped stripes at a time in a 64 stripe range, e.g., as would be appreciated by one skilled in the art after reading the present description. As noted above, host reads and writes directed to LBAs on a failed (e.g., "exposed") drive above the high water mark are processed as "Exposed Mode Read" and "Exposed Mode Write" operations. Accordingly, no LBAs on the replacement drive being rebuilt are accessed and/or modified as a result of receiving such data requests. However, host reads and writes directed to LBAs that are below the high water mark are processed as if the RAID array did not fail in the first place, e.g., as described above. It follows that LBAs on an exposed drive which are above the high water mark are not modified except by a rebuild operation, e.g., including parity LBAs. The performance bottleneck of a RAID rebuild is thereby often the volume of writes directed towards the drive being rebuilt.

Again, approaches herein are able to create deallocated blocks in an SSD when performing a RAID Rebuild by determining that the data to be written on the SSD would be equivalent to a deallocated block (i.e., zeroed data). This allows for approaches herein to avoid writing data to an SSD being rebuilt when the data is equivalent to a deallocated block and the SSD is pre-formatted. Moreover, approaches herein are able to incorporate a "zero detect" on a sum-of-product operation (e.g., used with an Exposed Mode Read operation) with little to no additional overhead, e.g., as would be appreciated by one skilled in the art after reading the present description. For instance, the sum-of-products involves multiplying (finite field multiply) data from each drive by a different constant, and subsequently XORed together to generate the recreated data.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM) for rebuilding a drive in a redundant array of independent disks (RAID) array, the method comprising:

in response to a failed drive in the RAID array being replaced with a replacement drive, determining whether the replacement drive can be pre-formatted;

in response to determining the replacement drive cannot be pre-formatted, initializing a high water mark;

recreating blocks of data that were stored in the failed drive;

determining whether the recreated blocks are equivalent to deallocated blocks;

and in response to determining one or more of the recreated blocks are equivalent to deallocated blocks, causing corresponding blocks in the replacement drive to be deallocated, wherein the drives in the RAID array include solid state drives (SSDs).

2. The CIM of claim 1, further comprising:

in response to a second failed drive in the RAID array being replaced with a second replacement drive and in response to determining the second replacement drive can be pre-formatted, causing blocks in the second replacement drive to be pre-formatted.

3. The CIM of claim 2, wherein causing the blocks in the second replacement drive to be pre-formatted includes deallocating all the blocks in the second replacement drive.

4. The CIM of claim 1, comprising:

in response to receiving a data request referencing data in the recreated blocks, determining whether the referenced data is below the high water mark;

in response to determining the referenced data is below the high water mark, using the corresponding blocks in the replacement drive to satisfy the data request; and in response to determining the referenced data is above the high water mark, using remaining drives in the RAID array to satisfy the data request.

5. The CIM of claim 1, wherein the recreating of the blocks of data that were stored in the failed drive includes:

performing an exposed mode read with zero detect operation on data stored in the remaining drives in the RAID array.

6. The CIM of claim 5, wherein the performing of the exposed mode read with zero detect operation includes XORing the data stored in the remaining drives in the RAID array.

7. The CIM of claim 6, wherein the performing of the exposed mode read with zero detect operation includes applying finite field multiplication to the data stored in the remaining drives in the RAID array.

8. The CIM of claim 1, further comprising:

in response to determining one or more of the recreated blocks are not equivalent to deallocated blocks, causing data in the one or more recreated blocks to be written to corresponding blocks in the replacement drive.

9. A computer program product (CPP) for rebuilding a drive in a redundant array of independent disks (RAID) array, the computer program product comprising:

a set of one or more computer-readable storage media; and program instructions, collectively stored in the set of one or more storage media, for causing a processor set to perform the following computer operations:

in response to a failed drive in the RAID array being replaced with a replacement drive, and in response to determining the replacement drive cannot be pre-formatted, initialize a high water mark;

recreate blocks of data that were stored in the failed drive using an exposed mode read with zero detect operation;

and in response to determining one or more of the recreated blocks are equivalent to deallocated blocks, cause corresponding blocks in the replacement drive to be deallocated.

10. The CPP of claim 9, wherein the program instructions are for causing the processor set to further perform the following computer operations:

in response to a second failed drive in the RAID array being replaced with a second replacement drive and in response to determining the second replacement drive can be pre-formatted, cause blocks in the second replacement drive to be pre-formatted.

11. The CPP of claim 10, wherein causing the blocks in the second replacement drive to be pre-formatted includes deallocating all blocks in the second replacement drive.

12. The CPP of claim 9, wherein the program instructions are for causing the processor set to further perform the following computer operations:

in response to receiving a data request referencing data in the recreated blocks, determine whether the referenced data is below the high water mark;

in response to determining the referenced data is below the high water mark, use the corresponding blocks in the replacement drive to satisfy the data request; and in response to determining the referenced data is above the high water mark, use remaining drives in the RAID array to satisfy the data request.

13. The CPP of claim 9, wherein the exposed mode read with zero detect operation is performed on data stored in the remaining drives in the RAID array.

14. The CPP of claim 13, wherein the performing of the exposed mode read with zero detect operation includes XORing the data stored in the remaining drives in the RAID array.

15. The CPP of claim 14, wherein the performing of the exposed mode read with zero detect operation includes applying finite field multiplication to the data stored in the remaining drives in the RAID array.

16. The CPP of claim 9, wherein the drives in the RAID array include solid state drives (SSDs).

17. A computer system (CS) for rebuilding a drive in a redundant array of independent disks (RAID) array, the computer system comprising:

a processor set;

a set of one or more computer-readable storage media; and program instructions, collectively stored in the set of one or more storage media, for causing the processor set to perform the following computer operations:

in response to a failed drive in the RAID array being replaced with a replacement drive;

and in response to determining the replacement drive cannot be pre-formatted, initialize a high water mark;

recreate blocks of data stored that were in the failed drive;

and in response to determining one or more of the recreated blocks are equivalent to deallocated blocks, cause corresponding blocks in the replacement drive to be deallocated, wherein the drives in the RAID array are selected from the group consisting of: solid state drives (SSDs), hard disk drives (HDDs), and magnetic tape drives.

18. A computer-implemented method (CIM) for rebuilding a drive in a redundant array of independent disks (RAID) array, the method comprising:

in response to a failed drive in the RAID array being replaced with a replacement drive and a determination that the replacement drive cannot be pre-formatted, initializing a high water mark;

recreating blocks of data that were stored in the failed drive;

in response to determining one or more of the recreated blocks are not equivalent to deallocated blocks, causing data in the one or more recreated blocks to be written to corresponding blocks in the replacement drive;

in response to determining one or more of the recreated blocks are equivalent to deallocated blocks, causing corresponding blocks in the replacement drive to be deallocated; and advancing the high water mark to incorporate the corresponding blocks in the replacement drive.

19. The CIM of claim 18, comprising:

in response to receiving a data request referencing data in the recreated blocks, determining whether the referenced data is below the high water mark;

in response to determining the referenced data is below the high water mark, using the corresponding blocks in the replacement drive to satisfy the data request; and in response to determining the referenced data is above the high water mark, using remaining drives in the RAID array to satisfy the data request.

20. The CIM of claim 18, wherein data in the RAID array is protected using a scheme selected from the group consisting of: RAID 5, RAID 6, RAID 1/10, and erasure codes.

21. The CIM of claim 18, wherein the recreating of the data stored in the failed drive includes:

performing an exposed mode read with zero detect operation on data stored in the remaining drives in the RAID array.

22. The CIM of claim 21, wherein the performing of the exposed mode read with zero detect operation includes XORing the data stored in the remaining drives in the RAID array.

23. The CIM of claim 22, wherein the performing of the exposed mode read with zero detect operation includes applying finite field multiplication to the data stored in the remaining drives in the RAID array.

24. The CIM of claim 18, wherein the drives in the RAID array include solid state drives (SSDs).

25. A computer program product (CPP) for rebuilding a drive in a redundant array of independent disks (RAID) array, the computer program product comprising:

a set of one or more computer-readable storage media; and program instructions, collectively stored in the set of one or more storage media, for causing a processor set to perform the following computer operations:

in response to a failed drive in the RAID array being replaced with a replacement drive and determining that the replacement drive cannot be pre-formatted, initializing a high water mark;

recreating blocks of data that were stored in the failed drive;

in response to determining one or more of the recreated blocks are not equivalent to deallocated blocks, causing data in the one or more recreated blocks to be written to corresponding blocks in the replacement drive;

in response to determining one or more of the recreated blocks are equivalent to deallocated blocks, causing corresponding blocks in the replacement drive to be deallocated; and advancing the high water mark to incorporate the corresponding blocks in the replacement drive.

\* \* \* \* \*